MAGNETIC RECORDING AND REPRODUCING MEANS

Filed June 1, 1954 2 Sheets-Sheet 1

INVENTORS
Vladimir K. Zworykin
& Paul K. Weimer
BY [signature]
ATTORNEY

Jan. 8, 1963 V. K. ZWORYKIN ETAL 3,072,751

MAGNETIC RECORDING AND REPRODUCING MEANS

Filed June 1, 1954 2 Sheets-Sheet 2

INVENTORS
Vladimir K. Zworykin
& Paul K. Weimer
BY Morris A. Rabkin
ATTORNEY

United States Patent Office 3,072,751

Patented Jan. 8, 1963

3,072,751

MAGNETIC RECORDING AND REPRODUCING MEANS

Vladimir K. Zworykin and Paul K. Weimer, Princeton, N.J., assignors to Radio Corporation of America, a corporation of Delaware Filed June 1, 1954, Ser. No. 433,629
3 Claims. (Cl. 179—100.2)

This invention relates to magnetic recording, and more particularly, but not necessarily exclusively, to novel means for and methods of imparting magnetic impressions corresponding to signal energy on a magnetic record receiving member and for reproducing the signals from such a record.

It is known that materials which exhibit paramagnetic properties at ordinary temperatures will undergo certain structural changes when sufficiently heated and will thereby lose their paramagnetic properties. When the materials have again cooled below the critical temperature, the paramagnetic properties again appear. This crictical temperature is called the Curie point or Curie temperature. Magnetic materials capable of having magnetic permeability much greater than a vacuum designated herein as having paramagnetic properties.

It is accordingly an object of the present invention to provide novel means for and methods of imparting a magnetic change on to magnetic record receiving member.

It is a further object of the present invention to provide novel means for and methods of reproducing signals previously recorded on a magnetic record receiving member.

It is another object of the present invention to provide novel means for and methods of reproducing a signal which has been previously recorded on a magnetic receiving member by practicing the present invention.

In accomplishing these and other objects, there has been provided, in accordance with the present invention, a magnetic record receiving member which is substantially uniformly premagnetized while enclosed within the vacuum chamber of a special vacuum tube structure. The premagnetized tape is reeled past a recording station at which an intensity modulated cathode ray beam is made to impinge upon the record receiving member. The impinging cathode ray beam heats the record receiving member into the range of Curie temperatures at least partially demagnetizing the record receiving member in accordance with the intensity modulation of the cathode ray beam. In reproducing such a record, the record receiving member is reeled past a reproducing station at which the record is scanned by a cathode ray beam and the magnetic influence of the record produces modulation of the scanning beam. This modulation is detected and used to reconstruct the recorded signal.

An understanding of this invention may be had from the following detailed description when read in connection with the accompanying drawings, in which.

Figure 1:
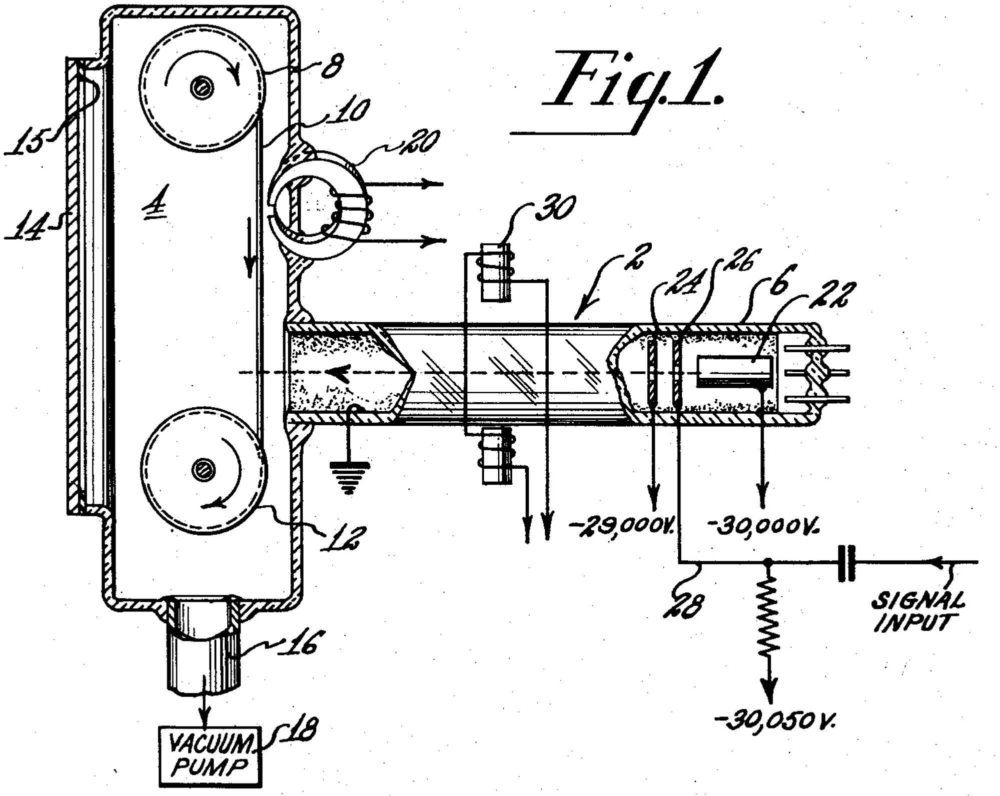
FIG. 1 is a schematic representation of a magnetic recording system according to the present invention.

Referring now to the drawings in more detail, there is shown in FIG. 1 a specially constructed vacuum tube arrangement 2. The vacuum tube 2 includes a tape reeling compartment 4 and a cathode ray beam portion 6. In the tape reeling compartment 4, there is housed a supply reel 8 carrying a magnetic record receiving member 10 and a take-up reel 12 for taking up the record receiving member 10. A port or access door 14 is provided whereby reels of tape in the tube 2 may be changed. A vacuum seal gasket 15 is provided to seal the port when the tube is in use. Since the vacuum must be broken from time to time by the opening of the port 14, means are also provided for evacuating the chamber. This means includes a passageway 16 leading to a vacuum pump 18.

Embedded in the wall of the compartment 4 or otherwise positioned adjacent the path of the record receiving member 10 is a means, such as a magnet 20, for imparting an initial magnetization to the magnetic record receiving member 10. A substantially uniform magnetization is preferably applied for ordinary recording purposes.

The cathode ray beam portion 6 of the tube structure 2 includes an electron gun 22 and suitable controlling grids 24 and 26 for producing a high intensity, high velocity electron beam. The signal to be recorded is applied to the control grid 26 through the lead 28 in a manner which may be conventional in the art relating to television. The signal thus applied causes an intensity modulation of an electron beam generated by the gun 22. The modulated electron beam is caused to traverse back and forth across the width of the record receiving member 10 in the manner of horizontal deflection in the art relating to television. This may be accomplished, for example, by means of a deflecting yoke 30. As the record receiving member 10 is advanced past the point of impingement by the cathode beam 6, the electrons of the cathode ray beam 6 scan successive lines across the width of the record, the vertical deflection component of the signal being accomplished by the advancement of the record receiving member 10.

If the signal applied to the control grid 26 is indeed video information, then the deflection yoke 30 may be operated at television standard horizontal deflection frequency. Thus, each scan line across the width of the record receiving member 10 will correspond to a horizontal line of video information.

As the modulated and deflected beam of electrons strikes the advancing record receiving member 10, the bombardment of the electrons causes heating in the magnetic material to a temperature in the Curie range of temperatures. Recalling that the magnetic record receiving member 10 was previously uniformly magnetized, the heating to the Curie range causes partial or complete demagnetization of elemental areas on the record receiving member 10 in accordance with the intensity of the modulated beam of electrons. The result will be that an image of the applied signal will remain on the magnetic record receiving member 10 in the form of residual magnetism.

Figure 2:
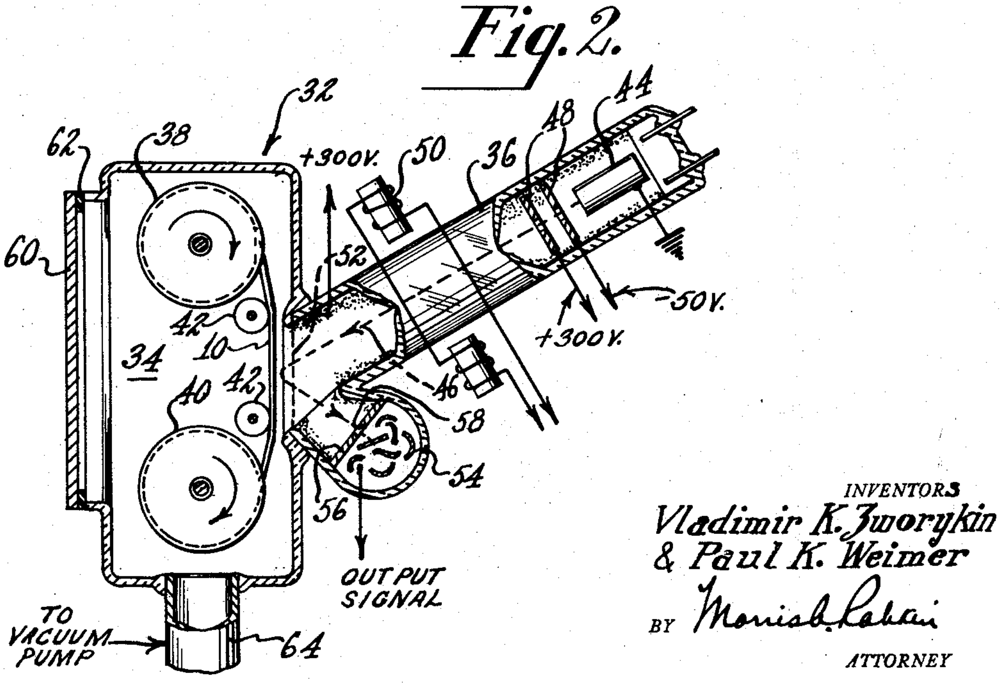
FIG. 2 is a schematic representation of a means for reproducing signals from a record made in accordance with the present invention.

In FIG. 2, there is shown one form of apparatus suitable for reproducing signals recorded in accordance with the technique hereinbefore set forth. This apparatus includes a special vacuum tube arrangement 32 which includes a record compartment 34 and a cathode ray beam portion 36. In the record compartment 34, there is provided a supply reel 38 for the record 10 and a take-up reel 40. Suitable means are provided for advancing the tape record 8 from the supply reel 38 to the take-up reel 40. Guide means 42 are provided for guiding the record 10 past the reading station.

Figure 3:
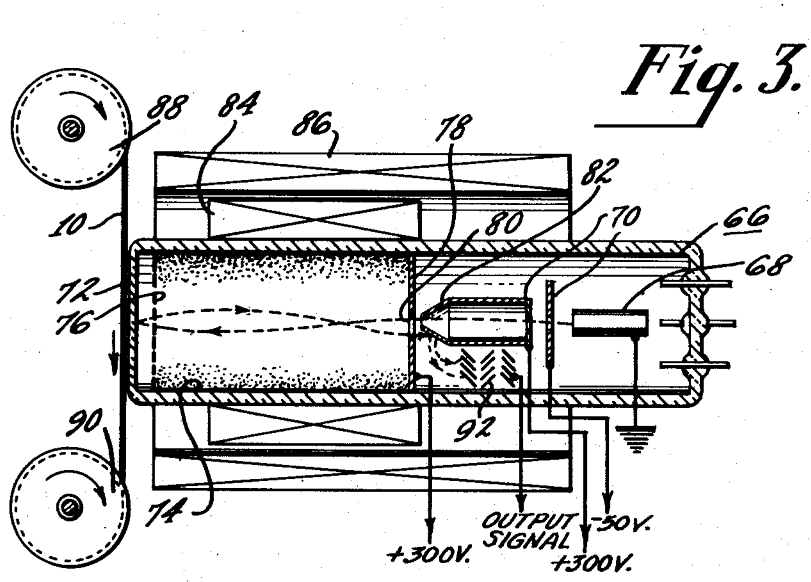
FIG. 3 is a schematic representation of a different means for reproducing magnetic records.

In the cathode ray beam portion 36, there is provided an electron gun 44 for developing a cathode ray beam 46. Suitable accelerating and focusing means including grids 48 are provided. Means are also provided for causing the beam 46 to be deflected in a direction transverse of the direction of motion of the record receiving member 10. Such means are represented generally by the deflecting yoke 50. It should, of course, be understood that any suitable and well known means may be used for effecting such deflection. The development of the cathode ray beam and the deflection thereof may be in accordance with known television techniques. The electron optics of this apparatus and of that shown in FIG. 3 are substantially in accordance with the teachings of U.S. Patent No. 2,579,351 issued to P. K. Weimer. The cathode ray beam 46 developed in this instance is, in contradistinction to that provided in the apparatus of FIG. 1, a low velocity beam. A fine mesh screen 52 is provided adjacent to the record member 10 but spaced therefrom in the area of the reading station. This screen provides a relatively uniform potential gradient between the end of the cathode ray beam portion 36 of the tube 32 and the face of the record 10. As the scanning beam 46 approaches the surface of the record bearing magnetic impressions, the beam is traveling at very low velocity. By proper selection of parameters, the beam will be deflected from an area immediately adjacent the face of the record 10 towards an electron multiplier 54. The reflected beam must pass through an aperture 58 in a plate 56 before arriving at the electron multiplier 54. Since the beam is traveling at low velocity, the electrons of the beam will be influenced by the minute magnetic fields developed by the elemental areas on the face of the record 10. These magnetic fields will tend to deflect the electrons of the cathode ray beam from their normal path by an amount which is a function of the intensity of the magnetization of those elemental areas or the strength of the field developed thereby. As the electrons in the beam are deflected by the influence of the magnetic signals on the record member, a greater or less portion of the beam will pass through the aperture 58 into the electron multiplier 54. This variation in the number of electrons striking the electron multiplier produces an output signal from the electron multiplier which corresponds to the signals recorded on the record member 10. As in the case of the apparatus in FIG. 1, the record transport mechanism is enclosed in the record compartment 34. To provide means for placing and removing records in the apparatus, there is provided an access door or port 60. A vacuum seal gasket 62 seals the port 60 when the tube is in use. Also means are provided for evacuating the tube arrangement. This includes a passageway 64 which leads to a vacuum pump.

In FIG. 3, there is shown a somewhat different apparatus for reproducing the signal from a record produced in accordance with the technique described in relation to FIG. 1. In FIG. 3, the apparatus shown is somewhat similar to that shown in FIG. 2 with the principal exceptions that the record member 10 is not enclosed within an evacuated compartment and secondly the record is scanned indirectly by a cathode ray beam whereas in the apparatus shown in FIG. 2, the record was scanned directly by the cathode ray beam.

The apparatus shown in FIG. 3 includes an evacuated envelope 66 in which is positioned an electron gun 68 and suitable beam forming electrodes 70. The electrodes including the electron gun 68 produce and focus a beam of electrons on an end wall 72 of the evacuated envelope 66. Coaxially mounted with the electron gun 68 and positioned between the electrodes 70 and the end wall 72 is a tubular electrode 74 to provide acceleration of the electron beam and to aid in focusing the beam on the end wall 72. Across the end of the tubular electrode adjacent to but spaced from the end wall 72, there is placed a fine mesh screen 76. Across the other end of the tubular electrode 74 adjacent to the beam forming electrode, there is placed a masking diaphragm 78 having a central aperture 80 therein. The forward end of the beam forming electrode constitutes a return beam dynode electrode 82. The end wall 72 of the evacuated envelope 66 is a very thin non-magnetic diaphragm. Surrounding the evacuated envelope are magnetic field producing coils 84 for producing electron beam focusing and deflecting fields 86. These function in a manner well established in the television art. As previously noted, the electron optics of the apparatus shown in FIG. 3 is substantially in accordance with the teachings of the aforesaid Weimer patent.

The magnetic record member 10 is positioned to run between a supply reel 88 and a take-up reel 90 in close proximity to the outside surface of the thin end wall 72 of the evacuated envelope 66. An electron beam formed within the envelope is caused to scan back and forth across the face of the tube. This beam again is a low velocity beam and approaches the end wall 72 with almost zero forward velocity. The elemental magnetic fields on the magnetic record member 10 cause the electrons of the beam to be deflected from their normal return path by an amount which is a function of the magnetic field strength of the elemental magnetic areas. The magnetic fields produced by these minute areas pass through the thin end wall and influence the beam as aforesaid. The return beam normally passes through the aperture 80 in the masking diaphragm 78 and strikes the dynode electrode 82 from which secondary electrons are emitted and caused to impinge upon electron multiplier plates 92. However, when the return beam is deflected by the magnetic fields developed by the record member, a greater or less portion of the beam passes through the diaphragm in accordance with the variations in the magnetic fields. The variations in the portion of the beam which passes through the aperture 80 produces a corresponding difference in the signal produced by operation of the electron multiplier 92. The output of the final stage of the electron multiplier constitutes a reproduction of the signal which was recorded on the record member 10 in accordance with the technique which was described with respect to FIG. 1.

Figure 4:
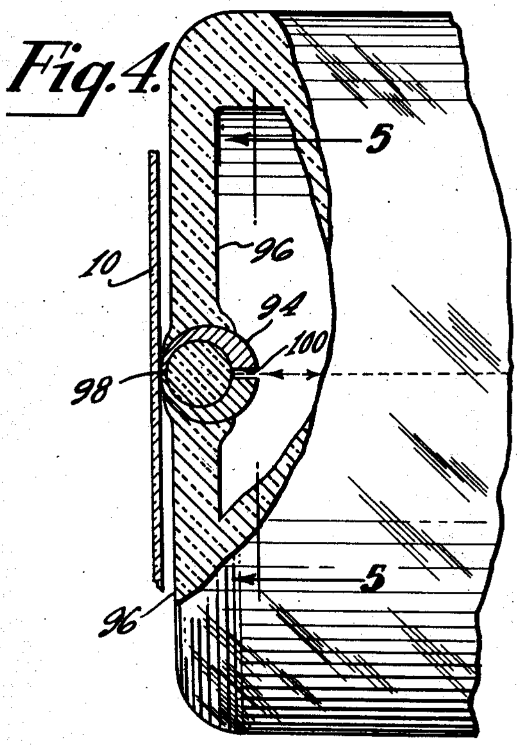
FIG. 4 is an enlarged view of a portion of a tube similar to that shown in FIG. 3 but disclosing a somewhat different signal detecting means; and, FIG. 5 is a view taken along the line 5—5 of FIG. 4 viewed in the direction of the arrows.
Figure 5:
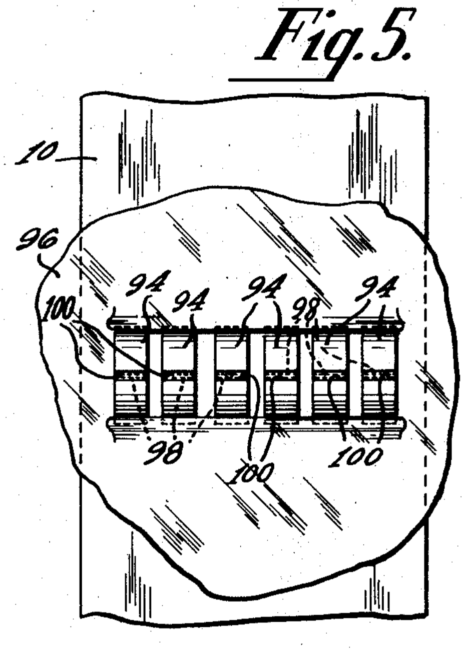

In FIGS. 4 and 5, the structure of the tube is substantially identical with that shown in FIG. 3 with the exception that a number of magnetic core members 94 are positioned in the end wall 96. These magnetic core members 94 comprise pairs of C-shaped members positioned to define minute signal reading gaps 98 at one end, externally of the end wall 96, and beam deflecting gaps 100 at the opposite end, internally of the end wall 96. As the record member 10 passes in contact with the signal reading gap, magnetic fields are induced into the core members 94 across the signal reading gap 98 and are carried through the end wall where the scanning beam scans across the end wall in the beam deflecting gaps 100. Here, as before, the magnetic fields from the tape cause a deflection of the electrons of the scanning beam in such a manner as to modulate the resulting beam striking the return beam dynode electrode. For purposes of clarity of illustration, only six core members have been shown. It will be appreciated that any desired number could be employed without departing from the spirit and scope of the present invention. These magnetic core members serve to enhance the influence of the magnetic record externally of the evacuated envelope on the scanning beam internally of the evacuated envelope.

Thus, there has been provided a novel and improved means for recording signals on a magnetic record receiving member and for reproducing the signals from such a record.

What is claimed is:

1. A magnetic recording system comprising means defining a vacuum chamber, means in said vacuum chamber for defining a path of advancement for a magnetizable record receiving member, means adjacent said path for premagnetizing the record receiving member, means within said chamber for bombarding said record receiving member with a high velocity, high intensity beam of electrons to heat selected areas of said record receiving member to a temperature in the range of Curie temperatures, and means for modulating the intensity of said beam of electrons in accordance with signal energy to be recorded.

2. A magnetic recording system comprising means defining a vacuum chamber, means in said vacuum chamber for defining a path of advancement for a magnetizable record receiving member, means adjacent said path for premagnetizing the record receiving member, means within said chamber for developing a high velocity, high intensity beam of electrons, means for bombarding said record receiving member with said beam of electrons to heat selected areas of said record receiving member to a temperature in the range of Curie temperatures, and means for modulating the intensity of said beam of electrons in accordance with signal energy to be recorded.

3. A magnetic recording system comprising means defining a vacum chamber, means in said vacuum chamber for defining a path of advancement for a magnetizable record receiving member, means adjacent said path for premagnetizing the record receiving member, means within said chamber for developing a high velocity beam of electrons, means for bombarding said record receiving member with said beam of electrons to heat selected areas of said record receiving member to a temperature in the range of Curie temperatures, means for modulating the intensity of said beam of electrons in accordance with signal energy to be recorded, and deflecting means for causing said beam to scan sequential lines extending transverse the direction of advancement of the record receiving member.

References Cited in the file of this patent

UNITED STATES PATENTS

| | | |
|---|---|---|
| 2,165,307 | Skellett | July 11, 1939 |
| 2,245,286 | Marzocchi | June 10, 1941 |
| 2,483,398 | Brastad | Oct. 4, 1949 |
| 2,535,497 | Jones | Dec. 26, 1950 |
| 2,540,527 | Ingels | Feb. 6, 1951 |
| 2,630,484 | Groak | Mar. 3, 1953 |
| 2,657,378 | Gray | Oct. 27, 1953 |
| 2,698,928 | Pulvari | Jan. 4, 1955 |
| 2,720,558 | Skellett | Oct. 11, 1955 |
| 2,724,021 | Goeppinger | Nov. 15, 1955 |
| 2,839,601 | Fries | June 17, 1958 |
| 2,857,458 | Sziklai | Oct. 21, 1958 |
| 2,900,443 | Camras | Aug. 18, 1959 |
| 2,915,594 | Burns | Dec. 1, 1959 |
| 2,979,572 | Levin | Apr. 11, 1961 |